(12) United States Patent
Kanie et al.

(10) Patent No.: US 8,192,880 B2
(45) Date of Patent: Jun. 5, 2012

(54) FUEL CELL SYSTEM (75) Inventors: Naoki Kanie, Toyota (JP); Masahiro Okuyoshi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 380 days.

(21) Appl. No.: 12/531,266

(22) PCT Filed: Oct. 16, 2008

(86) PCT No.: PCT/JP2008/069176
§ 371 (c)(1),
(2), (4) Date: Sep. 14, 2009

(87) PCT Pub. No.: WO2009/054428
PCT Pub. Date: Apr. 30, 2009

(65) Prior Publication Data
US 2010/0035107 A1 Feb. 11, 2010

(30) Foreign Application Priority Data

Oct. 25, 2007 (JP) ................. 2007-277163
Dec. 25, 2007 (JP) ................. 2007-332474

(51) Int. Cl.
*H01M 8/04* (2006.01)
(52) U.S. Cl. ........ 429/430; 429/431; 429/432; 429/450; 429/414

(58) Field of Classification Search ............. 429/24, 429/12, 26, 413, 414, 430–432, 450
See application file for complete search history.

(56) References Cited

U.S. PATENT DOCUMENTS

| | | | |
|---|---|---|---|
| 6,057,051 A * | 5/2000 | Uchida et al. | 429/414 |
| 7,455,920 B2 * | 11/2008 | Sakai | 429/414 |
| 2006/0068240 A1 * | 3/2006 | Matoba | 429/12 |
| 2009/0162710 A1 * | 6/2009 | Kajiwara | 429/22 |

FOREIGN PATENT DOCUMENTS

| | | |
|---|---|---|
| JP | 2002-246059 A | 8/2002 |
| JP | 2004-281069 A | 10/2004 |
| JP | 2005-032654 A | 2/2005 |
| JP | 2005-085537 A | 3/2005 |
| JP | 2005-114344 A | 4/2005 |
| JP | 2005-332676 A | 12/2005 |
| JP | 2006-140044 A | 6/2006 |
| JP | 2006-147414 A | 6/2006 |
| JP | 2006-216350 A | 8/2006 |
| JP | 2007-035464 A | 2/2007 |
| WO | WO 2008/047526 * | 4/2008 |

* cited by examiner

*Primary Examiner* — Jerry Lorengo
*Assistant Examiner* — Carlos Barcena
(74) *Attorney, Agent, or Firm* — Kenyon & Kenyon LLP (57) ABSTRACT A fuel cell system of the invention includes, a fuel cell, a water reservoir configured to accumulate water discharged from the fuel cells, and a status estimator configured to estimate a status of the water reservoir based on a stated of the fuel cell.

18 Claims, 6 Drawing Sheets

EXAMPLE OF TIMING CHART IN PROCESS OF EXHAUST DRAINAGE VALVE TEMPERATURE ESTIMATION

FUEL CELL SYSTEM

This is a 371 national phase application of PCT/JP2008/069176 filed 16 Oct. 2008, which claims priority of Japanese Patent Applications No. 2007-277163 filed 25 Oct. 2007, and No. 2007-332474 filed 25 Dec. 2007, respectively, the contents of which are incorporated herein by reference.

TECHNICAL FIELD

The present invention relates to a fuel cell system including a fuel cell.

BACKGROUND ART

In a fuel cell system equipped with a water reservoir arranged to accumulate water discharged from fuel cells, one proposed structure provides a temperature sensor in the water reservoir to identify the status of the water reservoir.

Size reduction or weight reduction of the fuel cell system has been highly demanded to allow the fuel cell system to be compactly mounted on a vehicle or another equivalent moving body. It is accordingly required to develop a technique of identifying the status of the water reservoir without using the temperature sensor in the fuel cell system.

DISCLOSURE OF THE INVENTION

By taking into account the problem of the prior art discussed above, there would thus be a demand for size reduction or weight reduction of a fuel cell system equipped with a water reservoir.

In order to accomplish at least part of the demand mentioned above and the other relevant demands, a first aspect of the invention is directed to a fuel cell system including: a fuel cell; a water reservoir configured to accumulate water discharged from the fuel cell; and a status estimator configured to estimate a status of the water reservoir based on a state of the fuel cell.

The fuel cell system according to the first aspect of the invention estimates the status of the water reservoir without requiring a temperature sensor provided in the water reservoir. This arrangement ensures size reduction or weight reduction of the fuel cell system.

In the fuel cell system according to the first aspect of the invention, the status estimator estimates presence or absence of the water accumulated in the water reservoir, based on an internal resistance value of the fuel cell. The fuel cell system of this arrangement estimates the status of water accumulation in the water reservoir without requiring a temperature sensor provided in the water reservoir.

In the fuel cell system of the first aspect of the invention, the status estimator estimates presence or absence of the water accumulated in the water reservoir, based on the internal resistance value of the fuel cell at a time of termination of previous power generation. The fuel cell system of this arrangement estimates the status of water accumulation in the water reservoir based on the internal resistance value at the time of termination of previous power generation by the fuel cell, without requiring a temperature sensor provided in the water reservoir.

In the fuel cell system of the first aspect further has a coolant flow path arranged to make flow of a coolant used for cooling down the fuel cell. Upon estimation of the presence of the water accumulated in the water reservoir, the status estimator estimates a status of the water based on a coolant temperature in the coolant flow path. The fuel cell system of this arrangement estimates the status of the water in the water reservoir, without requiring a temperature sensor provided in the water reservoir.

In the fuel cell system of the first aspect of the invention, the coolant flow path has at least partly a height difference in a vertical direction. The water reservoir is located between a higher position and a lower position in the coolant flow path and is arranged to be in contact with the fuel cell. In a flow stop state of the coolant in the coolant flow path prior to start of power generation by the fuel cell, when the coolant temperature at the lower position in the coolant flow path is higher than a preset first reference value, the status estimator estimates the status of the water in a non-supercooled, liquid state. The fuel cell system of this arrangement estimates the status of the water in the water reservoir, without requiring a temperature sensor provided in the water reservoir.

In another preferable application of the fuel cell system of the first aspect of the invention, the coolant flow path has at least partly a height difference in a vertical direction. The water reservoir is located between a higher position and a lower position in the coolant flow path and is arranged to be in contact with the fuel cell. In a flow stop state of the coolant in the coolant flow path prior to start of power generation by the fuel cell, when the coolant temperature at the lower position in the coolant flow path is not higher than a preset second reference value and when the coolant temperature at the higher position in the coolant flow path is higher than a preset third reference value that is lower than the second reference value, the status estimator estimates the status of the water in a supercooled state. The fuel cell system of this application estimates the status of the water in the water reservoir, without requiring a temperature sensor provided in the water reservoir.

In the first aspect of the invention, the fuel cell system further has: an exhaust valve arranged to discharge the water from the water reservoir; and a valve controller configured to perform open-close control of the exhaust valve. Upon estimation of the status of the water in the supercooled state by the status estimator, the valve controller prohibits valve-open control of the exhaust valve until satisfaction of a predetermined condition. The fuel cell system of this arrangement effectively prevents the supercooled water accumulated in the water reservoir from being frozen in the flow to the exhaust valve, thus preventing the exhaust valve from being uncontrollable.

In still another preferable application of the fuel cell system of the first aspect of the invention, the coolant flow path has at least partly a height difference in a vertical direction. The water reservoir is located between a higher position and a lower position in the coolant flow path and is arranged to be in contact with the fuel cell. In a flow stop state of the coolant in the coolant flow path prior to start of power generation by the fuel cell, when the coolant temperature at the lower position in the coolant flow path is not higher than a preset fourth reference value and when the coolant temperature at the higher position in the coolant flow path is not higher than a preset fifth reference value that is lower than the fourth reference value, the status estimator estimates the status of the water in a frozen state. The fuel cell system of this application estimates the status of the water in the water reservoir, without requiring a temperature sensor provided in the water reservoir.

In the fuel cell system according to the first aspect of the invention, the water reservoir has an exhaust valve arranged to discharge the water from the water reservoir. The fuel cell system of this embodiment further has: a coolant flow path arranged to make flow of a coolant used for cooling down the fuel cell; a valve temperature estimator configured to estimate an exhaust valve temperature; and a valve temperature storage unit configured to store the exhaust valve temperature estimated by the valve temperature estimator. The valve temperature estimator detects the coolant temperature at a time of start of power generation by the fuel cell and estimates a lower temperature between the detected coolant temperature and the exhaust valve temperature stored in the valve temperature storage unit at a time of termination of previous power generation as the exhaust valve temperature at the time of start of power generation. At a restart of power generation by the fuel cell shortly after termination of power generation by the fuel cell, when the coolant temperature is not lower than a preset reference value but the actual exhaust valve temperature is lower than the preset reference value, the exhaust valve temperature at the time of termination of previous power generation by the fuel cell is estimated as the current exhaust valve temperature. The fuel cell system of this arrangement effectively prevents the exhaust valve temperature from being erroneously determined to be not lower than the preset reference value and prevents incorrect identification of the potential for freezing the exhaust valve, thus preventing the exhaust valve from being uncontrollable.

In the fuel cell system of the first aspect of the invention, the valve temperature estimator detects the coolant temperature and newly estimates the exhaust valve temperature at the time of start of power generation by the fuel cell, based on the detected coolant temperature and a previous estimate value of the exhaust valve temperature. The fuel cell system of this application ensures accurate estimation of the exhaust valve temperature.

In of the fuel cell system of the first aspect of the invention, the valve temperature estimator identifies a potential or no potential for freezing the exhaust valve, based on the estimated exhaust valve temperature. The fuel cell system of this application ensures accurate identification of the potential or no potential for freezing the exhaust valve.

In the fuel cell system of the first aspect of the invention further has an exhaust valve freezing information storage unit. Upon identification of a potential for freezing the exhaust valve, the valve temperature estimator stores freezing potential information representing the potential for freezing the exhaust valve into the exhaust valve freezing information storage unit. The fuel cell system of this arrangement promptly identifies the permission or the prohibition for the valve-open control of the exhaust valve.

In another preferable application of the invention, the fuel cell system of the above application further has an exhaust valve freezing information storage unit. Upon identification of no potential for freezing the exhaust valve, the valve temperature estimator stores freezing potential cancellation information representing substantially no potential for freezing the exhaust valve into the exhaust valve freezing information storage unit. The fuel cell system of this arrangement promptly identifies the permission or the prohibition for the valve-open control of the exhaust valve.

In the fuel cell system according to the first aspect of the invention, the coolant flow path may be formed inside or in proximity to the fuel cell. Such layout causes a temperature distribution of the coolant in the coolant flow path to be quickly responded to a temperature distribution in the fuel cell, thus ensuring accurate estimation of the status of the water in the water reservoir based on the coolant temperature.

The technique of the invention is not restricted to the fuel cell system having any of the arrangements discussed above but may also be actualized by diversity of other device applications including a control circuit of the fuel cell system and a vehicle equipped with the fuel cell system, as well as by diversity of method applications including a control method of the fuel cell system. Other applications of the invention includes computer programs configured to construct any of the device applications and the method applications, recording media in which such computer programs are recorded, and data signals configured to include such computer programs and embodied in carrier waves.

In the application of the invention as the computer program or as the recording medium in which the computer program is recorded, the invention may be constructed as the whole program of controlling the operation of the fuel cell system or another device or method application or as only characteristic part of the program actualizing the functions of the invention.

BEST MODES OF CARRYING OUT THE INVENTION

Some modes of carrying out the invention are described below as preferred embodiments with reference to the accompanied drawings.

A. First Embodiment

A1. Configuration of Fuel Cell System 1000

Figure 1:
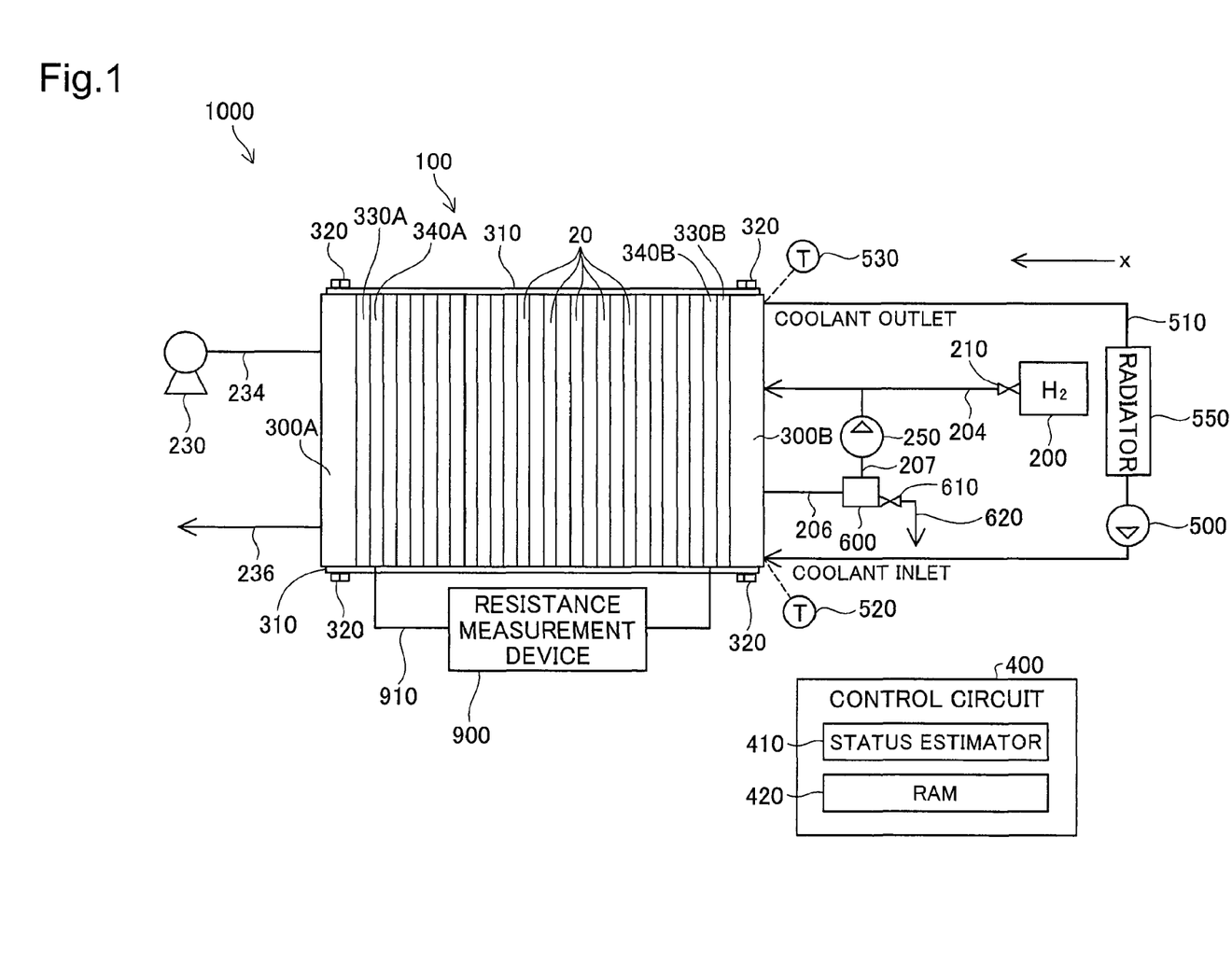
FIG. 1 is a block diagram illustrating the schematic configuration of a fuel cell system in a first embodiment of the invention.

FIG. 1 is a block diagram illustrating the schematic configuration of a fuel cell system 1000 in a first embodiment of the invention. The direction of an arrow in FIG. 1 is defined as an x direction. The fuel cell system 1000 of the embodiment mainly includes a fuel cell (a fuel cell stack) 100, a hydrogen tank 200, a compressor 230, a control circuit 400, a coolant circulation pump 500, temperature sensors 520 and 530, a radiator 550, a gas liquid separator 600, an exhaust drainage valve 610, a hydrogen circulation pump 250, a hydrogen cutoff valve 210, and a resistance measurement device 900.

The fuel cell stack 100 has relatively small-sized polymer electrolyte fuel cells having high power generation efficiency. The fuel cell stack 100 includes multiple fuel cells 20, end plates 300A and 300B, tension plates 310, insulators 330A and 330B, and terminals 340A and 340B. In the fuel cell stack 100, the end plate 300A, the insulator 330A, the terminal 340A, the multiple fuel cells 20, the terminal 340B, the insulator 330B, and the end plate 300B are stacked in this sequence. The tension plates 310 are joined with the respective end plates 300 with bolts 320, so that the multiple fuel cells 20 are fastened in a stacking direction by a preset force.

Each fuel cell 20 has a membrane electrode assembly (not shown), an anode separator (not shown), and a cathode separator (not shown). The membrane electrode assembly has an electrolyte membrane (not shown), a cathode (not shown) and an anode (not shown) as electrodes, and gas diffusion layers (not shown). The electrolyte membrane with the cathode and the anode formed on the respective faces thereof is placed between the gas diffusion layers to give the membrane electrode assembly. The fuel cell 20 is constructed by further interposing the membrane electrode assembly between the anode separator and the cathode separator.

The hydrogen tank 200 is a reservoir of high-pressure hydrogen gas and is connected to the fuel cell stack 100 (more specifically, to a fuel gas supply manifold explained later) via a fuel gas supply conduit 204. The hydrogen cutoff valve 210 and a regulator (not shown) are provided on the fuel gas supply conduit 204 in this sequence from the side of the hydrogen tank 200. At an open position of the hydrogen cutoff valve 210, a supply of hydrogen gas is fed as a fuel gas to the fuel cell stack 100. A system of producing hydrogen by a reforming reaction of a predetermined material, for example, an alcohol, a hydrocarbon, an aldehyde, and supplying the produced hydrogen to the anodes of the fuel cells may be provided, instead of the hydrogen tank 200.

The compressor 230 is connected to the fuel cell stack 100 (more specifically, to an oxidizing gas supply manifold explained later) via an oxidizing gas supply conduit 234. The compressor 230 compresses the air and supplies the compressed air as an oxidizing gas to the cathodes of the fuel cells. The fuel cell stack 100 (more specifically, an oxidizing gas exhaust manifold explained later) is also connected with an oxidizing gas exhaust conduit 236. After an electrochemical reaction at the cathodes, exhaust of the oxidizing gas flows through the oxidizing gas exhaust conduit 236 and is discharged out of the fuel cell system 1000.

Figure 2:
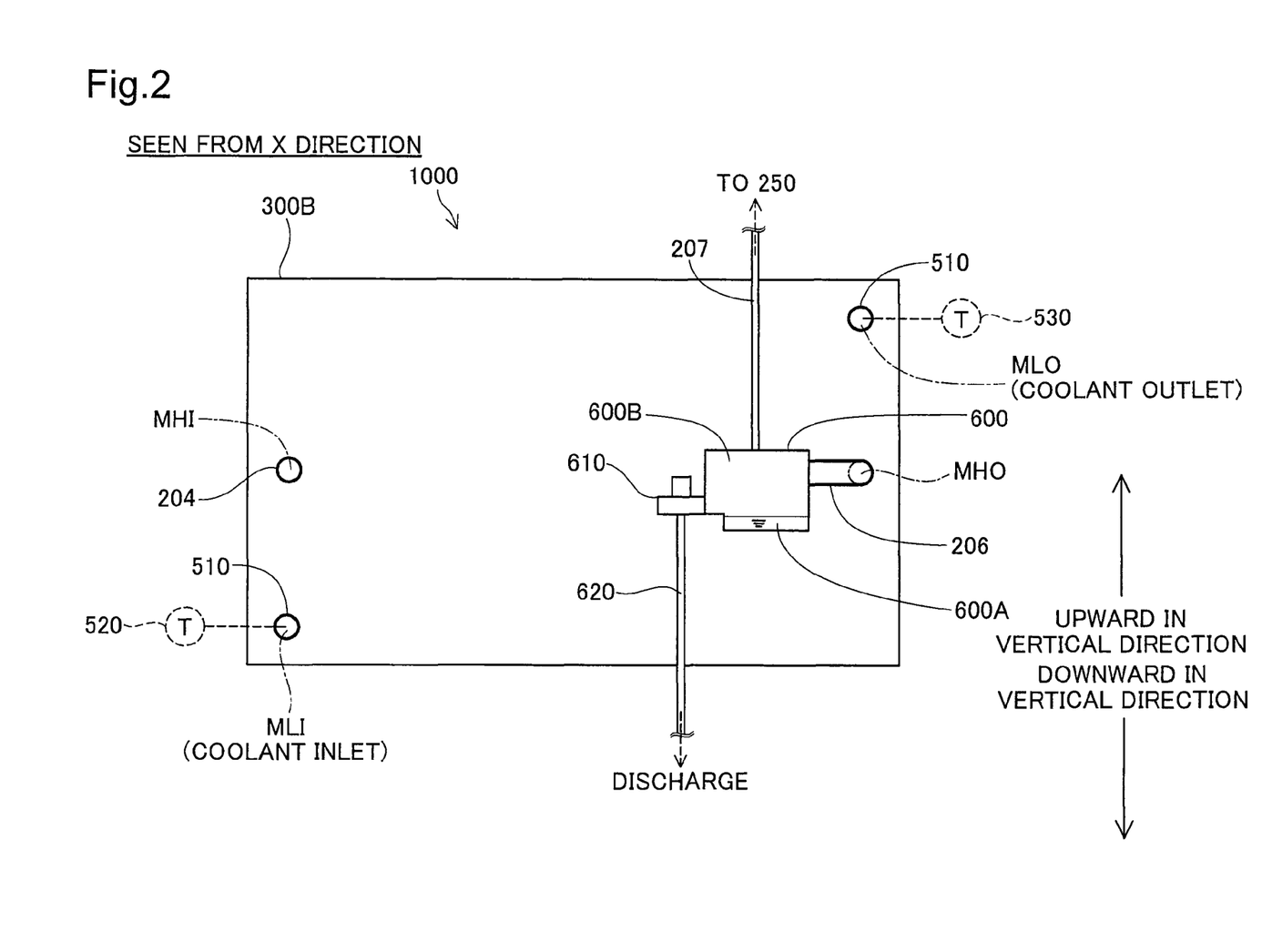
FIG. 2 is a front view showing an end plate provided at one side end of a fuel cell stack.

FIG. 2 is a front view showing the end plate 300B provided at one side end of the fuel cell stack 100. The view of FIG. 2 shows the end plate 300B seen from the x direction of FIG. 1. Downward and upward in FIG. 2 respectively represent downward and upward in a vertical direction. The fuel cell system 1000 is described more in detail with reference to FIGS. 1 and 2.

The fuel cell stack 100 includes a fuel gas supply manifold MHI (see FIG. 2), a fuel gas exhaust manifold MHO (see FIG. 2), an oxidizing gas supply manifold (not shown), an oxidizing gas exhaust manifold (not shown), and a coolant discharge manifold MLO (see FIG. 2). The fuel gas supply manifold MHI is arranged to supply the fuel gas to the respective fuel cells 20. The fuel gas exhaust manifold MHO is arranged to collect exhaust of the fuel gas from the respective fuel cells 20 and discharge the fuel gas exhaust out of the fuel cell stack 100. The oxidizing gas supply manifold is arranged to supply the oxidizing gas to the respective fuel cells 20. The oxidizing gas exhaust manifold is arranged to collect exhaust of the oxidizing gas from the respective fuel cells 20 and discharge the oxidizing gas exhaust out of the fuel cell stack 100. The coolant supply manifold MLI is arranged to supply a coolant between respective pairs of adjacent fuel cells 20. An external connection port of the coolant supply manifold MLI (hereafter may be referred to as coolant inlet) is open at a lower position in the vertical direction in the fuel cell stack 100. An external connection port of the coolant discharge manifold (hereafter may be referred to as coolant outlet) is open at an upper position in the vertical direction in the fuel cell stack 100. As a typical example, the coolant is water or a liquid mixture of water and ethylene glycol (antifreeze liquid).

The coolant supply manifold MLI (coolant inlet) and the coolant discharge manifold MLO (coolant outlet) of the fuel cell stack 100 are respectively connected with a coolant circulation channel 510. The coolant supply manifold MLI, the coolant discharge manifold MLO, and the coolant circulation channel 510 form a coolant circulation flow path.

The coolant circulation pump 500 and the radiator 550 are provided on the coolant circulation channel 510. The radiator 550 cools down the coolant warmed by the heat generated in the fuel cell stack 100. The coolant circulation pump 500 supplies the coolant cooled down by the radiator 550 to the fuel cell stack 100. This arrangement enables the fuel cell stack 100 to be continuously cooled down by means of the coolant.

In the coolant circulation flow path, the temperature sensor 520 is located at the coolant inlet, and the temperature sensor 530 is located at the coolant outlet. The temperature sensor 520 is used to detect a coolant temperature [° C.] at a lower position in the coolant circulation flow path (hereafter referred to as lower-position coolant temperature T1). The temperature sensor 530 is used to detect a coolant temperature [° C.] at a higher position in the coolant circulation flow path (hereafter referred to as higher-position coolant temperature T2).

The gas liquid separator 600 is connected to the fuel gas exhaust manifold MHO of the fuel cell stack 100 via a fuel gas exhaust conduit 206 as shown in FIG. 2. The gas liquid separator 600 includes a condenser 600A configured to condense the water vapor included in the fuel gas exhaust discharged from the fuel cell stack 100 and a reservoir 600B configured to accumulate the condensate water condensed by the condenser 600A and the liquid water discharged from the fuel cell stack 100. In the description hereafter, the water accumulated in the reservoir 610B is referred to as 'accumulated water'. As shown in FIG. 2, the gas liquid separator 600 is located between the coolant inlet (coolant discharge manifold MLO) and the coolant outlet (coolant supply manifold MLI) in the vertical direction and is arranged to bring its side face into contact with the end plate 300B of the fuel cell stack 100. The exhaust drainage valve 610 is provided on the gas liquid separator 600. The exhaust drainage valve 610 is connected with an exhaust drainage flow path 620. During operation of the fuel cell system 1000, the exhaust drainage valve 610 is opened regularly to discharge the fuel gas exhaust containing the impurity (for example, nitrogen) of the increased concentration after an electrochemical reaction at the anodes and the accumulated water in the reservoir 600B via the fuel gas exhaust conduit 206, the gas liquid separator 600, the exhaust drainage valve 610, and the exhaust drainage flow path 620 out of the fuel cell system 1000 at regular intervals.

The gas liquid separator 600 is also connected with the fuel gas supply conduit 204 via a gas circulation passage 207 as shown in FIGS. 1 and 2. The hydrogen circulation pump 250 is provided on the gas circulation passage 207. The fuel gas exhaust discharged from the fuel cell stack 100 (through the fuel gas exhaust manifold MHO) to the gas liquid separator 600 is introduced via the gas circulation passage 207 into the fuel gas supply conduit 204 by means of the hydrogen circulation pump 250. The remaining hydrogen gas included in the fuel gas exhaust is thus recycled and reused as the fuel gas for power generation. An ion exchange unit may be provided at a connection between the gas liquid separator 600 and the fuel gas exhaust conduit 206 to remove ions contained in the liquid water discharged from the fuel cell stack 100.

The resistance measurement device 900 is connected with the terminals 340A and 340B of the fuel cell stack 100 via wiring 910 to measure an internal resistance value of the fuel cell stack 100 (hereafter referred to as FC resistance value). The resistance measurement device 900 applies alternating current of a preset frequency between the terminals 340A and 340B and measures a voltage between the terminals 340A and 340B. The resistance measurement device 900 detects the FC resistance value, based on a phase difference between an ac component of the applied electric current and an ac component of the observed voltage and the frequencies of the ac components of the applied electric current and the observed voltage.

The electrolyte membrane of each fuel cell 20 in the fuel cell stack 100 has the low membrane resistance in the wet condition and the high membrane resistance in the dry condition. In the fuel cell stack 100, the greater internal water accumulation leads to the lower FC resistance value, while the less internal water accumulation leads to the higher FC resistance value. The FC resistance value is thus regarded as an indication of the water accumulation status inside the fuel cell stack 100.

In the state of no power generation by the fuel cell stack 100 with the coolant circulation pump 500 at stop, the circulation of the coolant causes a temperature distribution in the coolant circulation flow path and makes the higher-position coolant temperature T2 higher than the lower-position coolant temperature T1. In the fuel cell stack 100, the coolant in the coolant supply manifold MLI and in the coolant discharge manifold MLO has the higher heat capacity than those of the other constituents. There is accordingly a temperature distribution in the fuel cell stack 100 corresponding to the temperature distribution of the coolant supply manifold MLI and the coolant discharge manifold MLO. As explained previously, the gas liquid separator 600 is located between the coolant inlet where the lower-position coolant temperature T1 is detected and the coolant outlet where the higher-position coolant temperature T2 is detected and is arranged to bring its side face into contact with the end plate 300B of the fuel cell stack 100. The temperature of the accumulated water in the gas liquid separator 600 is thus estimable to be a value between the higher-position coolant temperature T2 and the lower-position coolant temperature T1.

The control circuit 400 is constructed as a microcomputer-based logic circuit and includes a CPU (not shown) configured to perform various calculations and operations according to preset control programs, a ROM (not shown) configured to store in advance control programs and control data required for the various calculations and operations performed by the CPU, a RAM 420 configured to temporarily read and write diversity of data required for the various calculations and operations performed by the CPU, and an input-output port (not shown) configured to input and output diversity of signals. The control circuit 400 controls the operations of the hydrogen cutoff valve 210, the compressor 230, the hydrogen circulation pump 250, the coolant circulation pump 500, the exhaust drainage valve 610, and the resistance measurement device 900 via control signal lines (not shown) connecting with the input-output port, thus controlling the whole fuel cell system 1000. The control circuit 400 also receives detection signals and measurement signals from various sensors including temperature sensors via detection signal lines (not shown).

The control circuit 400 has the function of a status estimator 410 to perform a water status estimation process described below. At the time of termination of power generation by the fuel cell stack 100, the control circuit 400 controls the resistance measurement device 900 to continually detect the FC resistance value of the fuel cell stack 100 (FC resistance value Ri) and stores the detected FC resistance value Ri into the RAM 420.

A2. Water Status Estimation Process

Figure 3:
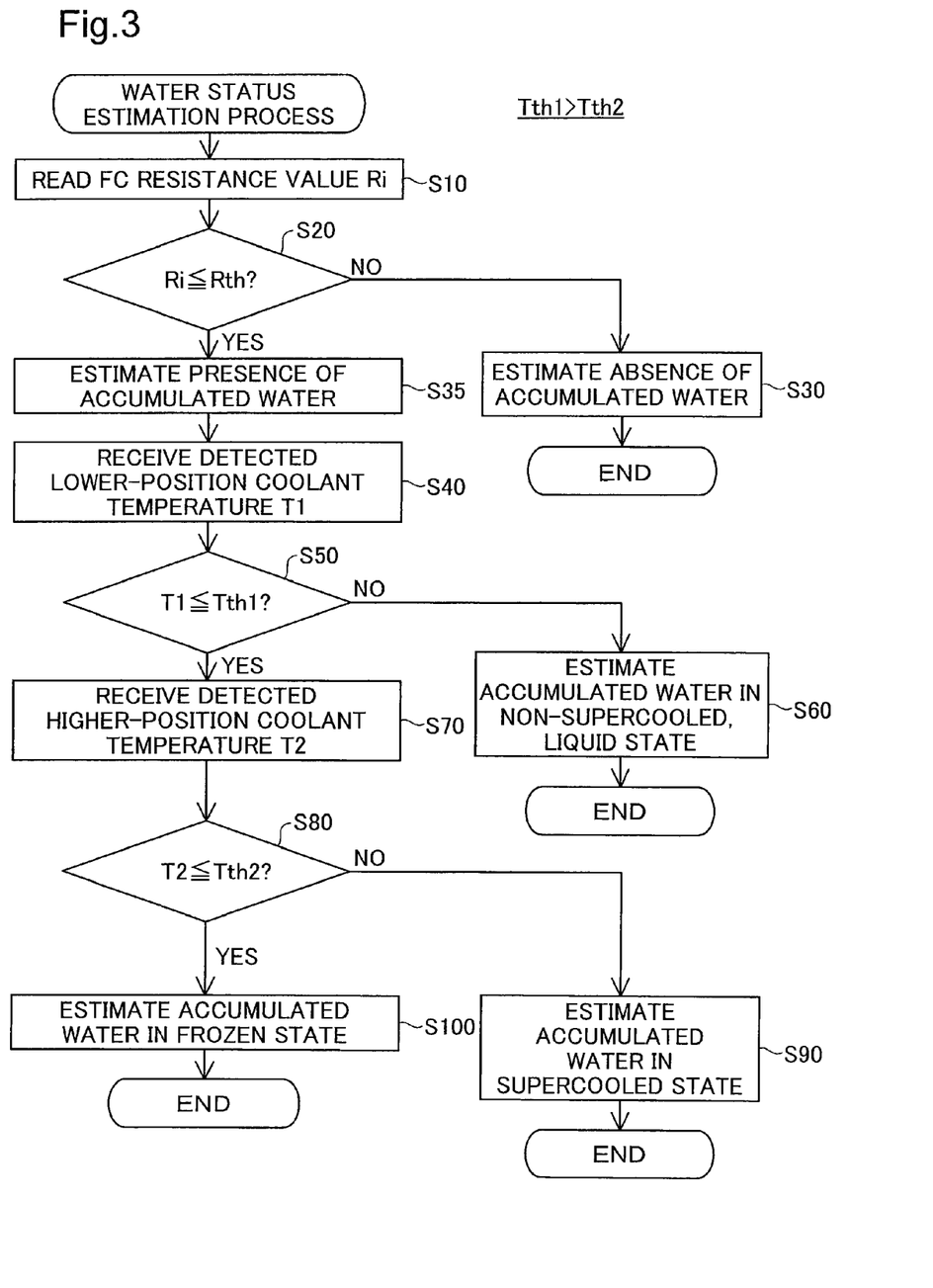
FIG. 3 is a flowchart showing a processing routine of water status estimation executed in the fuel cell system of the first embodiment.

FIG. 3 is a flowchart showing a processing routine of water status estimation executed in the fuel cell system 1000 of this embodiment. The water status estimation process is performed prior to a start of power generation by the fuel cell stack 100. Namely the water status estimation process is performed at the closed positions of the hydrogen cutoff valve 210 and the exhaust drainage valve 610 before the operations of the hydrogen circulation pump 500, the compressor 230, and the hydrogen circulation pump 250. The water status estimation process estimates the status of water in the gas liquid separator 600 before a start of power generation by the fuel cell stack 100. More specifically the water status estimation process estimates the presence or the absence of accumulated water in the gas liquid separator 600 and, upon estimation of the water presence, further estimates whether the accumulated water is in the non-supercooled, liquid state, in the supercooled state, or in the frozen state.

In the water status estimation process, the status estimator 410 first reads the FC resistance value Ri from the RAM 420 (step S10) and determines whether the FC resistance value Ri is not greater than a preset reference value Rth (step S20).

When the FC resistance value Ri is greater than the preset reference value Rth (step S20: no), the status estimator 410 assumes little water accumulation in the fuel cell stack 100 at the time of termination of previous power generation by the fuel cell stack 100. The status estimator 410 accordingly estimates the absence of accumulated water (or very little accumulated water) in the gas liquid separator 600 (step S30). The status estimator 410 then immediately terminates this processing routine.

When the FC resistance value Ri is not greater than the preset reference value Rth (step S20: yes), on the other hand, the status estimator 410 assumes much water accumulation in the fuel cell stack 100 at the time of termination of previous power generation by the fuel cell stack 100. The status estimator 410 accordingly estimates the presence of accumulated water in the gas liquid separator 600 (step S35).

The status estimator 410 subsequently receives the lower-position coolant temperature T1 detected by the temperature sensor 520 (step S40).

The status estimator 410 then determines whether the lower-position coolant temperature T1 is not higher than a preset reference temperature Tth1 (step S50). The reference temperature Tth1 is adequately specified according to the concrete design and specification of the fuel cell system 1000 and is set to, for example, a value '0' representing the melting point of water.

When the lower-position coolant temperature T1 is higher than the preset reference temperature Tth1 (step S50: no), the status estimator 410 assumes that the temperature of the accumulated water in the gas liquid separator 600 is higher than the preset reference temperature Tth1. The status estimator 410 accordingly estimates that the accumulated water in the gas liquid separator 600 is in the non-supercooled, liquid state (step S60). The status estimator 410 then terminates this processing routine.

When the lower-position coolant temperature T1 is not higher than the preset reference temperature Tth1 (step S50: yes), on the other hand, the status estimator 410 receives the higher-position coolant temperature T2 detected by the temperature sensor 530 (step S70).

The status estimator 410 then determines whether the higher-position coolant temperature T2 is not higher than a preset reference temperature Tth2 (step S80). The reference temperature Tth2 is lower than the reference temperature Tth1. The reference temperature Tth2 is adequately specified according to the concrete design and specification of the fuel cell system 1000 and is set to, for example, a value in a range of '−20' to '−40' allowing a stable shift of supercooled water from the supercooled state to the frozen state.

When the higher-position coolant temperature T2 is higher than the preset reference temperature Tth2 (step S80: no), the status estimator 410 assumes that the temperature of the accumulated water in the gas liquid separator 600 is higher than the preset reference temperature Tth2 but is not higher than the preset reference temperature Tth1. The status estimator 410 accordingly estimates that the accumulated water in the gas liquid separator 600 is in the supercooled state (step S90). The status estimator 410 then terminates this processing routine.

When the higher-position coolant temperature T2 is not higher than the preset reference temperature Tth2 (step S80: yes), on the other hand, the status estimator 410 assumes that the temperature of the accumulated water in the gas liquid separator 600 is not higher than the preset reference temperature Tth2. The status estimator 410 accordingly estimates that the accumulated water in the gas liquid separator 600 is in the frozen state (step S100). The status estimator 410 then terminates this processing routine.

On completion of the water status estimation process, the control circuit 400 operates the coolant circulation pump 500, the compressor 230, and the hydrogen circulation pump 250 and opens the hydrogen cutoff valve 210 to start power generation by the fuel cell stack 100. Upon estimation of the absence of the accumulated water (step S30 in FIG. 3), upon estimation of the accumulated water in the non-supercooled, liquid state (step S60 in FIG. 3), or upon estimation of the accumulated water in the frozen state (step S100 in FIG. 3) in the water status estimation process explained above, the control circuit 400 regularly performs the valve open-close control of the exhaust drainage valve 610 without any limitation to discharge the fuel gas exhaust containing the impurity of the increased concentration and the accumulated water in the reservoir 600B out of the fuel cell system 1000 at regular intervals.

Upon estimation of the accumulated water in the supercooled state (step S90 in FIG. 3) in the water status estimation process explained above, the control circuit 400 prohibits the valve-open control of the exhaust drainage valve 610 until a status shift of the accumulated water from the supercooled state after a start of power generation by the fuel cell stack 100. On elapse of a predetermined time period since the start of power generation by the fuel cell stack 100, for example, the control circuit 400 removes the prohibition of the valve open-close control of the exhaust drainage valve 610 based on assumption of the status shift of the accumulated water from the supercooled state by the heat transmitted from the fuel cell stack 100 to the gas liquid separator 600, the heat produced by condensation of the water vapor included in the fuel gas exhaust, and the heat included in the liquid water discharged from the fuel cell stack 100.

As described above, the fuel cell system 1000 of the embodiment estimates the water status in the gas liquid separator 600 based on the FC resistance value Ri of the fuel cell stack 100, the lower-position coolant temperature T1, and the higher-position coolant temperature T2 without providing an additional temperature sensor in the gas liquid separator 600. This arrangement desirably ensures size reduction or weight reduction of the fuel cell system 1000.

In the fuel cell system 1000 of the embodiment, upon estimation of the accumulated water in the supercooled state (step S90 in FIG. 3) by the status estimator 410, the control circuit 400 prohibits the valve-open control of the exhaust drainage valve 610 until a status shift of the accumulated water from the supercooled state after a start of power generation by the fuel cell stack 100. This arrangement effectively prevents the accumulated water in the supercooled state from being frozen in the flow through the exhaust drainage valve 610 and thus avoids the potential failure of the valve open-close control of the exhaust drainage valve 610.

The combination of the gas liquid separator 600 and the exhaust drainage valve 610 in the embodiment corresponds to the water reservoir in the claims of the invention. The exhaust drainage valve 610 and the status estimator 410 in the embodiment are respectively equivalent to the exhaust valve and the status estimator in the claims of the invention. The combination of the coolant discharge manifold MLO, the coolant supply manifold MLI, and the coolant circulation channel 510 forming the coolant circulation flow path in the embodiment is equivalent to the coolant flow path in the claims of the invention. The reference temperature Tth1 in the embodiment corresponds to any one of the first reference value, the second reference value, and the fourth reference value in the claims of the invention. The reference temperature Tth2 in the embodiment corresponds to either one of the third reference value and the fifth reference value in the claims of the invention. The control circuit 400 in the embodiment is equivalent to the valve controller in the claims of the invention.

B. Second Embodiment

B1. Configuration of Fuel Cell System 1000A

Figure 4:
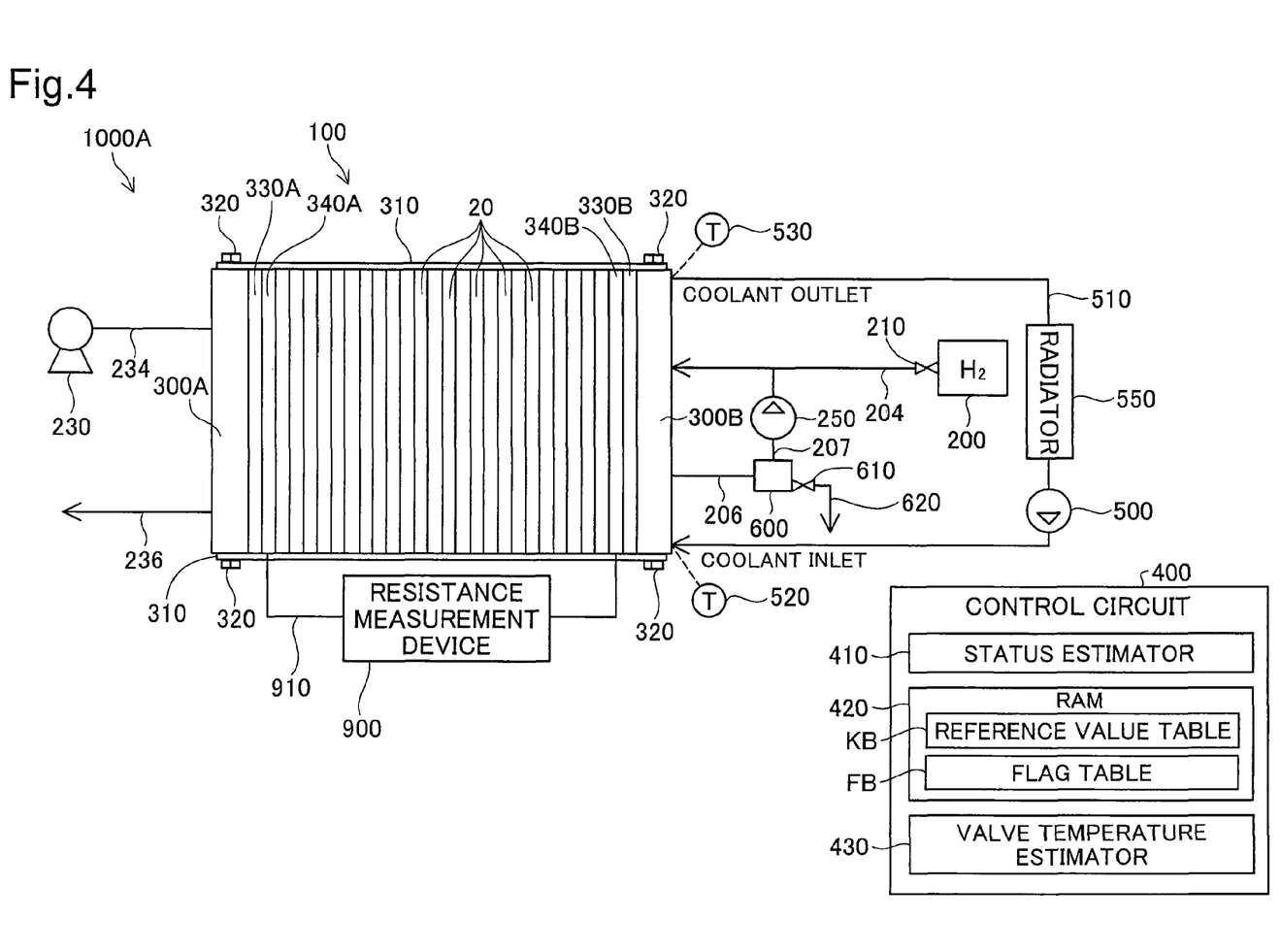
FIG. 4 is a block diagram illustrating the schematic configuration of a fuel cell system in a second embodiment of the invention.

FIG. 4 is a block diagram illustrating the schematic configuration of a fuel cell system 1000A in a second embodiment of the invention. The fuel cell system 1000A of the second embodiment basically has the similar structure to that of the fuel cell system 1000 of the first embodiment described above, except that the control circuit 400 has the function of a valve temperature estimator 430 and that the RAM 420 stores a reference value table KB, a flag table FB, and estimate equation data KD therein. The other constituents in the fuel cell system 1000A are identical with those in the fuel cell system 1000. The fuel cell system 1000A performs an exhaust drainage valve temperature estimation process, as well as the water status estimation process that is performed in the fuel cell system 1000 of the first embodiment as explained above. The exhaust drainage valve temperature estimation process estimates the temperature of the exhaust drainage valve 610 provided in the gas liquid separator 600 and sets and stores an exhaust drainage valve freezing potential flag FG representing the potential for freezing the exhaust drainage valve 610, based on the estimate temperature.

The valve temperature estimator 430 performs the exhaust drainage valve temperature estimation process. The reference value table KB stores an exhaust drainage valve temperature Tb estimated in the exhaust drainage valve temperature estimation process. The exhaust drainage valve temperature Tb stored in the reference value table KB is used as a criterion value for subsequent estimation of the exhaust drainage valve temperature Tb and is thus also referred to as previous estimate temperature KK. The flag table FB stores the exhaust drainage valve freezing potential flag FG. The estimate equation data KD represents an estimate equation specified in advance experimentally as explained later in detail. The exhaust drainage valve temperature estimation process is described in detail below.

Figure 5:
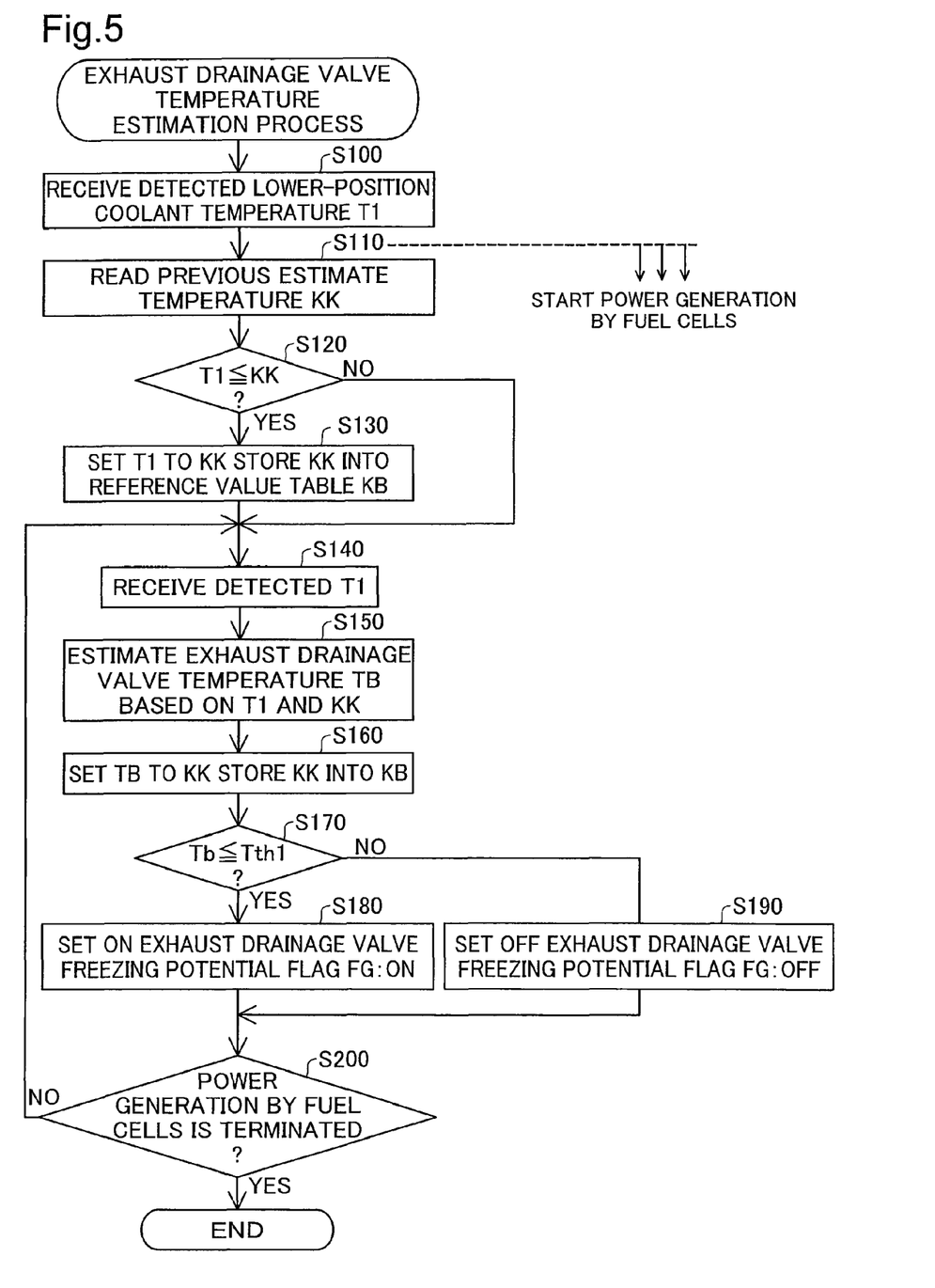
FIG. 5 is a flowchart showing a processing routine of exhaust drainage valve temperature estimation executed in the fuel cell system of the second embodiment.
Figure 6:
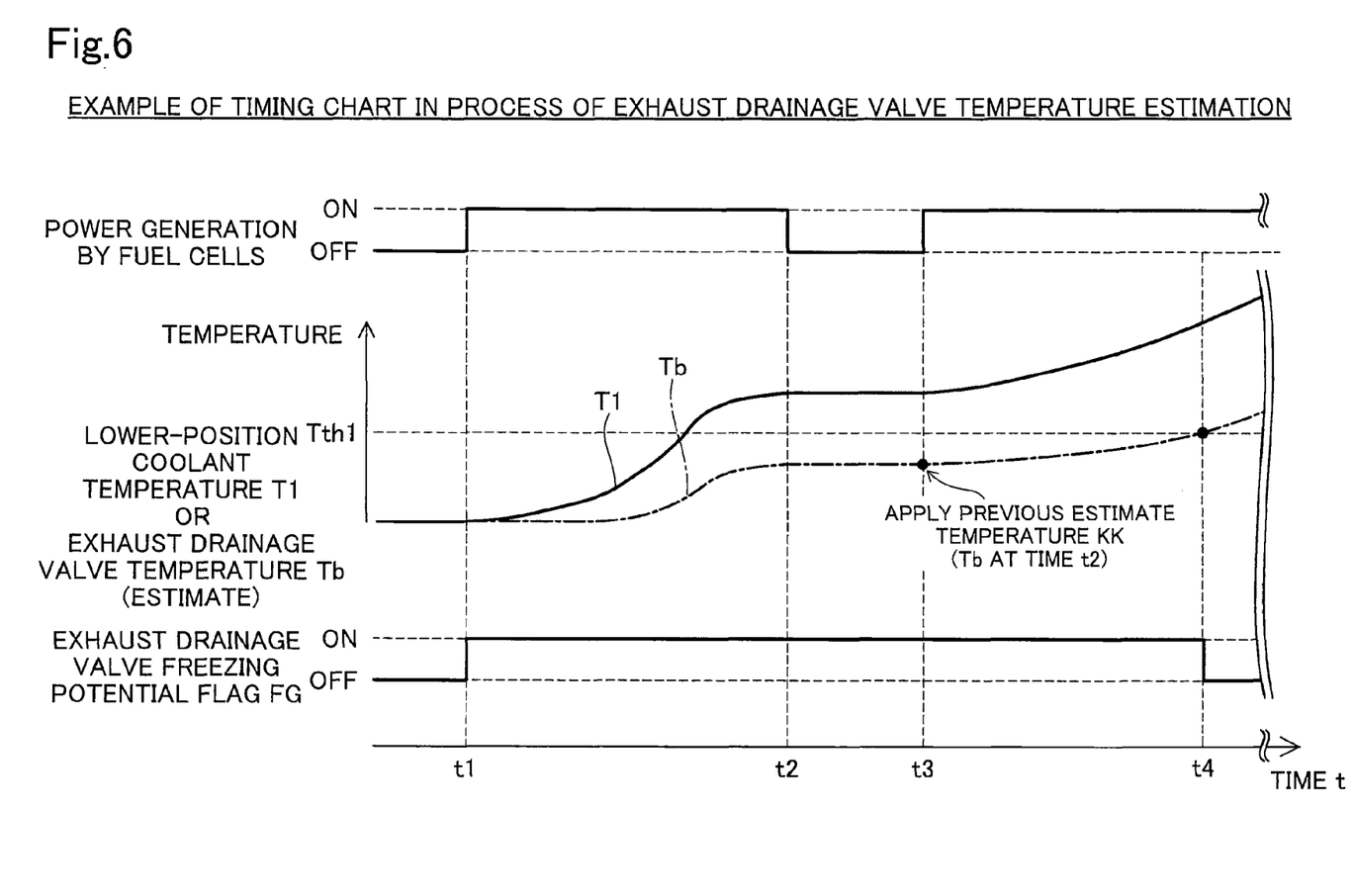
FIG. 6 is one example of a timing chart in the process of exhaust drainage valve temperature estimation.

FIG. 5 is a flowchart showing a processing routine of exhaust drainage valve temperature estimation executed in the fuel cell system 1000A of the second embodiment. FIG. 6 is one example of a timing chart in the process of exhaust drainage valve temperature estimation. In the timing chart of FIG. 6, the abscissa shows time 't'. The exhaust drainage valve temperature estimation process continues for a time period from a time immediately before a start of power generation by the fuel cell stack 100 to a time immediately after termination of power generation by the fuel cell stack 100 in the fuel cell system 1000A. The exhaust drainage valve temperature estimation process is started in the state of no power generation by the fuel cell stack 100. In this state of no power generation, the coolant circulation pump 500, the compressor 230, and the hydrogen circulation pump 250 are not operated, and the hydrogen cutoff valve 210 and the exhaust drainage valve 610 are at the closed positions. Power generation by the fuel cell stack 100 starts on completion of the processing at step S100 as explained below.

The valve temperature estimator 430 first receives the lower-position coolant temperature T1 detected by the temperature sensor 520 (step S100). On completion of the processing at step S100, the control circuit 400 operates the coolant circulation pump 500, the compressor 230, and the hydrogen circulation pump 250 and opens the hydrogen cutoff valve 210 to start power generation by the fuel cell stack 100 (see time points t1 and t3 in FIG. 6).

The valve temperature estimator 430 subsequently reads the previous estimate temperature KK from the reference value table KB (step S110) and compares the detected lower-position coolant temperature T1 received at step S100 with the read previous estimate temperature KK (step S120).

When the lower-position coolant temperature T1 is not higher than the previous estimate temperature KK (step S120: yes), the valve temperature estimator 430 sets the lower-position coolant temperature T1 to the previous estimate temperature KK and stores the setting of the previous estimate temperature KK into the reference value table KB (step S130). When the lower-position coolant temperature T1 is higher than the previous estimate temperature KK (step S120: no), on the other hand, the valve temperature estimator 430 proceeds to the processing of step S140.

The valve temperature estimator 430 then receives the newly detected lower-position coolant temperature T1 (step S140). The valve temperature estimator 430 reads out the estimate equation data KD and substitutes the lower-position coolant temperature T1 and the previous estimate temperature KK into the estimate equation represented by the estimate equation data KD to estimate the exhaust drainage valve temperature Tb at that moment (step S150). The estimate equation represented by the estimate equation data KD is defined here. According to the positional relation in the fuel cell system 1000A, the lower-position coolant temperature T1 is susceptible to the effect of the fuel cell stack 100, and the exhaust drainage valve temperature Tb has the slower temperature response than the lower-position coolant temperature T1. With an increase in temperature of the fuel cell stack 100, the lower-position coolant temperature T1 quickly increases, while the exhaust drainage valve temperature Tb increases with some delay from the lower-position coolant temperature T1. The estimate equation is formed by taking into account this temperature response delay to estimate the exhaust drainage valve temperature Tb based on the lower-position coolant temperature T1 and the previous estimate temperature KK set as the criterion value.

When the processing of step S150 is performed to estimate the exhaust drainage valve temperature Tb for the first time (for example, at a time t3 in the timing chart of FIG. 6) at the time of start of power generation by the fuel cell stack 100, the valve temperature estimator 430 estimates the previous estimate temperature KK stored in the reference value table KB as the exhaust drainage valve temperature Tb. The terminology 'at the time of start of power generation' is the concept including a time immediately before start of power generation and a time immediately after start of power generation. The previous estimate temperature KK at this time is the lower temperature between the detected lower-position coolant temperature T1 received at step S100 and the estimated exhaust drainage valve temperature Tb at the time of termination of previous power generation by the fuel cell stack 100. In a specified power generation time period, the lower between the estimated exhaust drainage valve temperature Tb at the time of termination of previous power generation by the fuel cell stack 100 and the lower-position coolant temperature T1 detected at the time of start of previous power generation is accordingly set to an initial value of the temperature of the exhaust drainage valve 610. For example, in the timing chart of FIG. 6, power generation by the fuel cell stack 100 starts at the time t3. The lower-position coolant temperature T1 is higher than the preset reference temperature Tth1 at the time t3. The exhaust drainage valve temperature Tb (previous estimate temperature KK) is lower than the preset reference temperature Tth1 at a time t2. The exhaust drainage valve temperature Tb (previous estimate temperature KK) at the time t2 or at the time of termination of power generation by the fuel cell stack 100 is thus estimated as the exhaust drainage valve temperature Tb at the time t3.

The valve temperature estimator 430 sets the estimated exhaust drainage valve temperature Tb to the previous estimate temperature KK and stores the setting of the previous estimate temperature KK into the reference value table KB (step S160).

The valve temperature estimator 430 then determines whether the estimated exhaust drainage valve temperature Tb is not higher than the preset reference temperature Tth1 (explained above in the first embodiment) (step S170). When the exhaust drainage valve temperature Tb is not higher than the preset reference temperature Tth1 (step S170: yes), the valve temperature estimator 430 assumes some potential for freezing the exhaust drainage valve 610. The exhaust drainage valve freezing potential flag FG stored in the flag table FB is accordingly set ON (step S180). For example, in the timing chart of FIG. 6, at a time t1 when power generation by the fuel cell stack 100 starts, the exhaust drainage valve temperature Tb is lower than the preset reference temperature Tth1. The exhaust drainage valve freezing potential flag FG is thus set ON at this moment.

When the exhaust drainage valve temperature Tb is higher than the preset reference temperature Tth1 (step S170: no), on the other hand, the valve temperature estimator 430 assumes no potential for freezing the exhaust drainage valve 610. The exhaust drainage valve freezing potential flag FG stored in the flag table FB is accordingly set OFF (step S190). For example, in the timing chart of FIG. 6, the exhaust drainage valve freezing potential flag FG is set OFF at a time t4 when the exhaust drainage valve temperature Tb becomes slightly higher than the preset reference temperature Tth1.

The valve temperature estimator 430 subsequently determines whether power generation by the fuel cell stack 100 is terminated (step S200). Upon non-termination of power generation by the fuel cell stack 100 (step S200: no), the valve temperature estimator 430 returns the processing flow to step S140 and repeats the processing of steps S140 to S180 or the processing of steps S140 to S190. Upon termination of power generation by the fuel cell stack 100 (step S200: yes), on the other hand, the valve temperature estimator 430 exits from this exhaust drainage valve temperature estimation process.

The control circuit 400 performs the valve-open control of the exhaust drainage valve 610 as needed in response to the ON setting of the exhaust drainage valve freezing potential flag FG stored in the flag table FB, while not performing the valve-open control of the exhaust drainage valve 610 in response to the OFF setting of the exhaust drainage valve freezing potential flag FG.

It is assumed that power generation by the fuel cell stack 100 is terminated (for example, at the time t2 in the timing chart of FIG. 6) in the state where the lower-position coolant temperature T1 reaches or exceeds the preset reference temperature Tth1 in the course of power generation by the fuel cell stack 100 but the temperature of the exhaust drainage valve 610 is still lower than the preset reference temperature Tth1. In the case where power generation by the fuel cell stack 100 is restarted soon (for example, at the time t3 in the timing chart of FIG. 6), the lower-position coolant temperature T1 at the moment may be still not lower than the preset reference temperature Tth1. If the lower-position coolant temperature T1 at the moment is estimated as the temperature of the exhaust drainage valve 610, the temperature of the exhaust drainage valve 610, which is actually lower than the preset reference temperature, may be erroneously determined to be not lower than the preset reference temperature Tth1. Such erroneous determination incorrectly sets OFF the exhaust drainage valve freezing potential flag FG. In this state, the accumulated water in the gas liquid separator 600 and the water present inside the exhaust drainage valve 610 may be supercooled water. The valve-open control of the exhaust drainage valve 610 based on the erroneous determination may thus cause the supercooled water to be frozen in the exhaust drainage valve 610 at the open position and may make the exhaust drainage valve 610 out of control.

In the exhaust drainage valve temperature estimation process executed in the fuel cell system 1000A of the embodiment, in the case of estimation of the exhaust drainage valve temperature Tb for the first time at the time of start of power generation by the fuel cell stack 100, the lower temperature between the lower-position coolant temperature T1 detected at the moment and the exhaust drainage valve temperature Tb at the time of termination of previous power generation by the fuel cell stack 100 is estimated as the exhaust drainage valve temperature Tb. At a restart of power generation by the fuel cell stack 100 shortly after termination of power generation by the fuel cell stack 100, when the lower-position coolant temperature T1 is not lower than the preset reference temperature Tth1 but the actual exhaust drainage valve temperature Tb is lower than the preset reference temperature Tth1, the exhaust drainage valve temperature Tb at the time of termination of previous power generation by the fuel cell stack 100 is estimated as the current exhaust drainage valve temperature Tb. This arrangement thus effectively prevents the exhaust drainage valve freezing potential flag FG from being incorrectly set OFF based on the erroneous determination that the exhaust drainage valve temperature Tb is not lower than the preset reference temperature Tth1, thus preventing the exhaust drainage valve 610 from being uncontrollable.

The exhaust drainage valve temperature estimation process executed in the fuel cell system 1000A of the embodiment first estimates the initial value of the exhaust drainage valve temperature Tb and subsequently estimates the exhaust drainage valve temperature Tb based on the previous estimate temperature KK set as the criterion value. This arrangement ensures the accurate estimation of the exhaust drainage valve temperature Tb.

The exhaust drainage valve temperature estimation process executed in the fuel cell system 1000A of the embodiment identifies whether there is a potential for freezing the exhaust drainage valve 610, based on the exhaust drainage valve temperature Tb. This arrangement ensures the accurate identification of the potential for freezing the exhaust drainage valve 610.

The exhaust drainage valve 610 and the coolant circulation channel 510 in the embodiment are respectively equivalent to the exhaust valve and the coolant flow path in the claims of the invention. The valve temperature estimator 430 in the embodiment corresponds to the valve temperature estimator in the claims of the invention. The ON setting of the exhaust drainage valve freezing potential flag FG in the embodiment is equivalent to the freezing potential information in the claims of the invention. The OFF setting of the exhaust drainage valve freezing potential flag FG in the embodiment is equivalent to the freezing potential cancellation information in the claims of the invention. The flag table FB in the embodiment corresponds to the exhaust valve freezing information storage unit in the claims of the invention.

C. Other Aspects

Among the constituents of the respective embodiments described above, the constituents other than those claimed by the independent claims are additional elements and may be omitted when not required. The embodiments and their applications discussed above are to be considered in all aspects as illustrative and not restrictive. There may be many modifications, changes, and alterations without departing from the scope or spirit of the main characteristics of the present invention. Some examples of possible modification are given below.

C1. Modified Example 1

In the water status estimation process (FIG. 3) executed in the fuel cell system 1000 of the embodiment discussed above, the control circuit 400 estimates the presence or the absence of the accumulated water in the gas liquid separator 600, based on the FC resistance value Ri at the time of termination of previous power generation by the fuel cell stack 100. This is, however, neither essential nor restrictive. In one modified procedure, the control circuit 400 may control the resistance measurement device 900 to detect the FC resistance value of the fuel cell stack 100 prior to execution of the water status estimation process or during previous power generation by the fuel cell stack 100 and estimate the presence or the absence of the accumulated water in the gas liquid separator 600 based on the detected FC resistance value. This modified arrangement has the similar effects to those of the embodiment discussed previously.

In another modified procedure, the control circuit 400 may detect the fuel cell temperature of the fuel cell stack 100 during previous power generation or at the time of termination of previous power generation by the fuel cell stack 100 and estimate the presence or the absence of the accumulated water in the gas liquid separator 600 based on the detected fuel cell temperature. The fuel cell temperature detected by the control circuit 400 is, for example, the higher-position coolant temperature T2 as the temperature of the coolant outlet. This modified arrangement does not require the resistance measurement device 900 for estimation of the presence or the absence of the accumulated water in the gas liquid separator 600, thus ensuring size reduction or weight reduction of the fuel cell system 1000.

In still another modified procedure, the control circuit 400 may detect the output electric current of the fuel cell stack 100 during previous power generation or at the time of termination of previous power generation by the fuel cell stack 100 and estimate the presence or the absence of the accumulated water in the gas liquid separator 600 based on the detected output electric current. This modified arrangement does not require the resistance measurement device 900 for estimation of the presence or the absence of the accumulated water in the gas liquid separator 600, thus ensuring size reduction or weight reduction of the fuel cell system 1000.

C2. Modified Example 2

The fuel cell system 1000 of the embodiment discussed above may be mounted on any of various vehicles including motor vehicles, boats and ships, aircraft, and linear motor cars. This application ensures the small-sized, light-weight on-board equipment.

C3. Modified Example 3

In the fuel cell system 1000A of the second embodiment described above, the exhaust drainage valve temperature estimation process uses the lower-position coolant temperature T1 as the temperature of the coolant. This is, however, neither essential nor restrictive. The higher-position coolant temperature T2 may alternatively be used as the temperature of the coolant. This modified arrangement has the similar effects to those of the embodiment discussed previously.

C4. Modified Example 4

In the fuel cell system 1000A of the second embodiment described above, the exhaust drainage valve temperature estimation process compares the lower-position coolant temperature T1 with the previous estimate temperature KK, sets the lower temperature to the new previous estimate temperature KK, and stores the new setting of the previous estimate temperature KK into the reference value table KB at steps S100 through S130. This series of processing is, however, neither essential nor restrictive. One modified flow of the exhaust drainage valve temperature estimation process may receive the detected higher-position coolant temperature T2, make comparison among the lower-position coolant temperature T1, the higher-position coolant temperature T2, and the previous estimate temperature KK, set the lowest temperature to the new previous estimate temperature KK, and store the new setting of the previous estimate temperature KK into the reference value table KB. This modified arrangement has the similar effects to those of the embodiment discussed previously.

The invention claimed is:

1. A fuel cell system, comprising:
   a fuel cell;
   a water reservoir configured to accumulate water discharged from the fuel cell; and
   a status estimator programmed to estimate a status of the water reservoir based on a state of the fuel cell,
   wherein the status estimator is programmed to estimate presence or absence of the water accumulated in the water reservoir based on an internal resistance value of the fuel cell.

2. The fuel cell system in accordance with claim 1, wherein the status estimator is programmed to estimate presence or absence of the water accumulated in the water reservoir, based on the internal resistance value of the fuel cell at a time of termination of previous power generation.

3. The fuel cell system in accordance with claim 1, the fuel cell system further comprising:
   a coolant flow path arranged to make flow of a coolant used for cooling down the fuel cell,
   wherein upon estimation of the presence of the water accumulated in the water reservoir, the status estimator is programmed to estimate a status of the water based on a coolant temperature in the coolant flow path.

4. The fuel cell system in accordance with claim 3, wherein the coolant flow path has at least partly a height difference in a vertical direction,
   the water reservoir is located between a higher position and a lower position in the coolant flow path and is arranged to be in contact with the fuel cell, and
   in a flow stop state of the coolant in the coolant flow path prior to start of power generation by the fuel cell, when the coolant temperature at the lower position in the coolant flow path is higher than a preset first reference value, the status estimator is programmed to estimate the status of the water in a non-supercooled, liquid state.

5. The fuel cell system in accordance with claim 4, wherein in a flow stop state of the coolant in the coolant flow path prior to start of power generation by the fuel cell, when the coolant temperature at the lower position in the coolant flow path is not higher than a preset second reference value and when the coolant temperature at the higher position in the coolant flow path is higher than a preset third reference value that is lower than the second reference value, the status estimator is programmed to estimate the status of the water in a supercooled state.

6. The fuel cell system in accordance with claim 5,
   wherein the water reservoir has an exhaust valve arranged to discharge the water from the water reservoir,
   the fuel cell system further comprising:
   a valve controller programmed to perform open-close control of the exhaust valve,
   wherein upon estimation of the status of the water in the supercooled state by the status estimator, the valve controller is programmed to prohibit valve-open control of the exhaust valve until satisfaction of a predetermined condition.

7. The fuel cell system in accordance with claim 4, wherein in a flow stop state of the coolant in the coolant flow path prior to start of power generation by the fuel cell, when the coolant temperature at the lower position in the coolant flow path is not higher than a preset fourth reference value and when the coolant temperature at the higher position in the coolant flow path is not higher than a preset fifth reference value that is lower than the fourth reference value, the status estimator is programmed to estimate the status of the water in a frozen state.

8. The fuel cell system in accordance with claim 3, wherein the coolant flow path has at least partly a height difference in a vertical direction,
   the water reservoir is located between a higher position and a lower position in the coolant flow path and is arranged to be in contact with the fuel cell, and
   in a flow stop state of the coolant in the coolant flow path prior to start of power generation by the fuel cell, when the coolant temperature at the lower position in the coolant flow path is not higher than a preset second reference value and when the coolant temperature at the higher position in the coolant flow path is higher than a preset third reference value that is lower than the second reference value, the status estimator is programmed to estimate the status of the water in a supercooled state.

9. The fuel cell system in accordance with claim 8,
wherein the water reservoir has an exhaust valve arranged to discharge the water from the water reservoir,
the fuel cell system further comprising:
a valve controller programmed to perform open-close control of the exhaust valve,
wherein upon estimation of the status of the water in the supercooled state by the status estimator, the valve controller is programmed to prohibit valve-open control of the exhaust valve until satisfaction of a predetermined condition.

10. The fuel cell system in accordance with claim 9, the fuel cell system further having:
a valve temperature estimator programmed to estimate an exhaust valve temperature; and
a valve temperature storage unit programmed to store the exhaust valve temperature estimated by the valve temperature estimator,
wherein the valve temperature estimator is programmed to detect the coolant temperature at a time of start of power generation by the fuel cell and to estimate a lower temperature between the detected coolant temperature and the exhaust valve temperature stored in the valve temperature storage unit at a time of termination of previous power generation as the exhaust valve temperature at the time of start of power generation.

11. The fuel cell system in accordance with claim 3,
wherein the coolant flow path has at least partly a height difference in a vertical direction,
the water reservoir is located between a higher position and a lower position in the coolant flow path and is arranged to be in contact with the fuel cell, and
in a flow stop state of the coolant in the coolant flow path prior to start of power generation by the fuel cell, when the coolant temperature at the lower position in the coolant flow path is not higher than a preset fourth reference value and when the coolant temperature at the higher position in the coolant flow path is not higher than a preset fifth reference value that is lower than the fourth reference value, the status estimator is programmed to estimate the status of the water in a frozen state.

12. The fuel cell system in accordance with claim 3,
wherein the water reservoir has an exhaust valve arranged to discharge the water from the water reservoir,
the fuel cell system further having:
a valve temperature estimator programmed to estimate an exhaust valve temperature; and
a valve temperature storage unit programmed to store the exhaust valve temperature estimated by the valve temperature estimator,
wherein the valve temperature estimator is programmed to detect the coolant temperature at a time of start of power generation by the fuel cell and to estimate a lower temperature between the detected coolant temperature and the exhaust valve temperature stored in the valve temperature storage unit at a time of termination of previous power generation as the exhaust valve temperature at the time of start of power generation.

13. The fuel cell system in accordance with claim 3,
wherein the coolant flow path is formed inside or in proximity to the fuel cell.

14. The fuel cell system in accordance with claim 1,
wherein the water reservoir has an exhaust valve arranged to discharge the water from the water reservoir,
the fuel cell system further having:
a coolant flow path arranged to make flow of a coolant used for cooling down the fuel cell;
a valve temperature estimator programmed to estimate an exhaust valve temperature; and
a valve temperature storage unit programmed to store the exhaust valve temperature estimated by the valve temperature estimator,
wherein the valve temperature estimator is programmed to detect the coolant temperature at a time of start of power generation by the fuel cell and to estimate a lower temperature between the detected coolant temperature and the exhaust valve temperature stored in the valve temperature storage unit at a time of termination of previous power generation as the exhaust valve temperature at the time of start of power generation.

15. The fuel cell system in accordance with claim 14,
wherein the valve temperature estimator is programmed to detect the coolant temperature and newly estimate the exhaust valve temperature at the time of start of power generation by the fuel cell, based on the detected coolant temperature and a previous estimate value of the exhaust valve temperature.

16. The fuel cell system in accordance with claim 14,
wherein the valve temperature estimator is programmed to identify a potential or no potential for freezing the exhaust valve, based on the estimated exhaust valve temperature.

17. The fuel cell system in accordance with claim 16,
the fuel cell system further having an exhaust valve freezing information storage unit,
wherein upon identification of a potential for freezing the exhaust valve, the valve temperature estimator is programmed to store freezing potential information representing the potential for freezing the exhaust valve into the exhaust valve freezing information storage unit.

18. The fuel cell system in accordance with claim 17,
wherein upon identification of no potential for freezing the exhaust valve, the valve temperature estimator is programmed to store freezing potential cancellation information representing substantially no potential for freezing the exhaust valve into the exhaust valve freezing information storage unit.

* * * * *